United States Patent

[11] 3,610,839

[72] Inventor Edward C. Sand
Willoughby, Ohio

[21] Appl. No. 823,733
[22] Filed May 12, 1969
[45] Patented Oct. 5, 1971
[73] Assignee Clevite Corporation

[54] REDUCED COUPLING MEANS FOR REDUNDANT MAGNETIC HEADS
7 Claims, 8 Drawing Figs.

[52] U.S. Cl. 179/100.2 C
[51] Int. Cl. G11b 5/12, G11b 5/10
[50] Field of Search 179/100.2 C; 340/174.1 F; 346/74 MC

[56] References Cited

UNITED STATES PATENTS

| | | | |
|---|---|---|---|
| 3,171,903 | 3/1965 | Wheeler et al. | 179/100.2 |
| 3,211,843 | 10/1965 | Dundovic et al. | 179/100.2 |
| 3,214,746 | 10/1965 | McCreary | 179/100.2 |

*Primary Examiner*—Bernard Konick
*Assistant Examiner*—Robert S. Tupper
*Attorney*—Eber J. Hyde

ABSTRACT: A redundant magnetic head is provided having an eddy current means between the head means and the electrically conductive housing of the redundant head and a shielding means which magnetically shields the eddy current means from the housing to reduce feedthru coupling between the read and write head.

PATENTED OCT 5 1971

3,610,839

INVENTOR.
EDWARD C. SAND

BY

Eber J. Hyde
ATTORNEY

REDUCED COUPLING MEANS FOR REDUNDANT MAGNETIC HEADS

BACKGROUND OF THE INVENTION

This invention relates to an improved magnetic head structure and, more particularly, relates to an improved redundant head structure, i.e., a dual gap transducer for simultaneously writing on and reading from one or a plurality of channels of a magnetic record medium.

In a redundant head the two gaps, the read gap and the write gap, are closely spaced together and the written information from the write gap is checked by the read gap soon after it has been recorded on the magnetic record medium. The information which is deposited on the magnetic record medium is stored until it appears at the read gap. In the last decade the distance between the read gap centerline and the write gap centerline has been reduced from 0.500 inch to 0.150 inch or even smaller.

The most serious problem that occurs in redundant heads having the read gap and write gap more closely spaced is that the write signal appears across the read gap or by some other means the flux from the write head is introduced into the windings of the read head. This is a particularly sensitive problem since the write head flux energy is several orders of magnitude greater than the flux intensity from the tape coupling the read winding. Generally, the signal from the record medium is one ten-thousandth of the signal from the write head. The flux that directly links the write head to the read head is actually stray flux from the write head; therefore, it can be reduced or redirected without changing the write characteristic of the write head substantially.

In prior art practice, the bracket or housing that supports the read and the write heads has been made of an electrically conductive material, causing eddy currents to be generated therein by the high-frequency components which come from the write head current. These eddy currents in the bracket attenuate the stray field of the write currents somewhat; however, the stray eddy currents themselves create a new field which has somewhat lower frequency components and which are introduced into the read head. The sum total of the stray field from the bracket, plus that which leaks directly through from the write head, often is sufficiently high to interfere with the read magnetic circuit. In order to compensate for this, the prior art has taught to provide a wraparound shield which may change the feedthru signal by a few percent, however, this does not limit the feedthru to a substantial degree.

In further attempts to stop this stray flux, the prior art has provided front shielding designs which are attached to the front of the head and adjacent the side of the record medium upon which the signals are to be recorded. These front shields have been used effectively to reduce the freedthru signal to 3 to 5 percent of the read signal. A front shield is difficult to position; furthermore, it interferes with the threading of the magnetic record medium in the machine and makes the head difficult to clean.

An object of the present invention is to provide a shield means for redundant magnetic heads that substantially attenuates the feedthru flux from the write head to the read head.

A further object of the present invention is to provide a shield means that attenuates feedthru but does not encumber the operation of the redundant head or the magnetic record medium in any manner.

A still further object of the present invention is to provide a shield means which further reduces the 3 to 5 percent feedthru signal in the read signal which remains with conventional front shielding.

A still further object of the present invention is to provide shield means which substantially reduces feedthru from the write core means to the read core means and thereby improves the redundant head structure in cost and operating convenience.

SUMMARY OF THE INVENTION

Briefly, in accordance with the present invention, a redundant magnetic head having read head means and write head means mounted within an electrically conductive housing for reading and writing on one or more channels of magnetic record medium and having conventional transverse shielding between the read and write heads is provided with an eddy current means which is located between the housing and the magnetic heads and is magnetically shielded from the housing.

The invention will be better understood from the following description of preferred embodiments to be read in conjunction with the accompanying drawing, and the features believed to be novel will be more particularly pointed out in the claims.

DESCRIPTION OF THE PREFERRED EMBODIMENTS

While the following description of the preferred embodiments is directed to a multichannel redundant magnetic head, it should be remembered that the present invention is equally applicable to a single channel redundant magnetic head.

Figures 1, 2, 3:
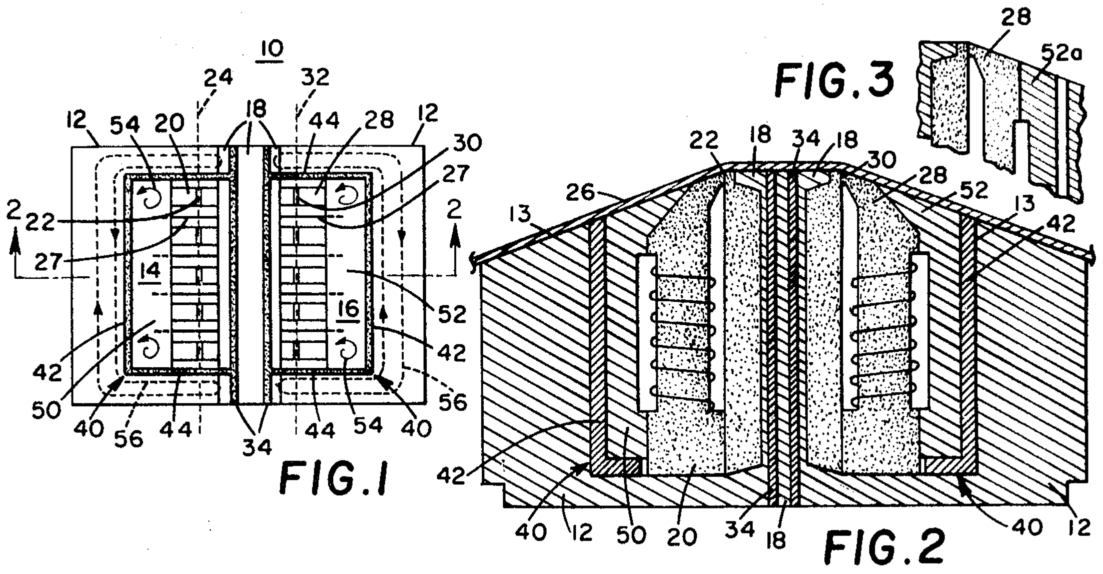
FIG. 1 is a top view of a redundant magnetic head showing the read and write core means and the shielding means.
FIG. 2 is an enlarged cross-sectional view along line 2—2 of the redundant magnetic head as shown in FIG. 1, and illustrates the location of the shielding means within the head.
FIG. 3 is a cutout view of an alternate design of the eddy current means.

Referring to FIG. 1, there is shown a top planar view of a multichannel redundant magnetic head unit 10 as it would appear to the magnetic record medium. This practical embodiment of the invention will be examined merely to facilitate the description of the invention, although it should be recognized that the concept of this invention is applicable to other magnetic head arrangements.

The multichannel redundant magnetic head unit 10, as illustrated in FIG. 1, generally comprises a housing or bracket 12 of electrically conductive material carrying a block of write magnetic head means 14 and a block of read magnetic head means 16 in housing recesses 13. The block of write magnetic head means 14 and the block of read magnetic head means 16 are spaced by a central dividing portion 18 of housing 12. The FIG. 6, the of write magnetic 1 means 14 comprises a plurality of write magnetic head means 20, in this instance five in number, particularly adapted for recording on a magnetic record medium and which are conventional commercial items well known in the art. Each write magnetic head means 20 has a write gap 22 generally filled with a gap spacer preferably made of a nonmagnetic metal, such as beryllium, copper, or silver, or it can be nonconductive and nonmagnetic material such as mylar or mica. The write magnetic head means 20 are aligned having their write gaps 22 on a centerline 24 which is transverse to the motion of the magnetic record medium 26, as shown in FIGS. 1 and 2.

The write magnetic head means 20 are interspaced by internal shields 27 which help prevent interference between each of the write magnetic transducer means 20. Shields 27 preferably are made of a magnetic material such as Mu metal or a combination of Mu metal and electrically conductive material to conduct stray flux and thereby reduce crosstalk between channels.

The block of read magnetic transducer means 14 comprises a plurality of read magnetic head means 28, in this instance five in number, particularly adapted for reading signals from a magnetic record medium and which are conventional commercial items well known in the art. Each read magnetic head means 28 has a read gap 30 of high-reluctance material. The read gaps 30 are aligned on a centerline 32 which is parallel to the write gap centerline 24 and is transverse to the motion of the record medium across the head unit 10.

As shown in FIG. 2, each of the read magnetic head means 28 is aligned longitudinally to the motion of the record medium with a corresponding write magnetic transducer means 20 so that a signal produced by the adjacent write transducer means 20 is recorded on the same channel of the record medium as is read by the read magnetic transducer means 28. The read magnetic transducer means 28 are interspaced by internal shields 27 identical to the shields 27 that interspace the write magnetic transducer means 20.

As shown in FIG. 2, the magnetic record medium 26 passes across the write gap 22 and then across the read gap 30. In a conventional redundant head, which is commercially available today, the distance between the write gap centerline 24 and the read gap centerline 32 is approximately 0.150 inch. As has been previously pointed out, the energy of the electromagnetic flux across the write gaps 22 is approximately 10,000 times the magnitude of the energy of the magnetic flux from the magnetic record medium 26 to the read gaps 30; therefore, some of the write energy appears across the gaps of the read heads if no shielding is provided.

In order to provide conventional shielding between the write magnetic head means 20 and the read magnetic head means 28 central dividing portion 18 of housing 12 carries transverse magnetic shielding means 34. As shown in FIG. 1 and FIG. 2, transverse shielding means 34 comprises two layers of shielding between the heads, or it can be one layer, as is well known in the art.

In accordance with the present invention a shielding means 40 is provided within the recesses 13 of housing 12. The shielding means 40, as shown in FIG. 1 and 2, lines the recesses 13 and has a transverse section 42 relative to the magnetic record medium 26, and longitudinal portions 44 relative to the motion of the magnetic record medium 26. While the effectiveness of the location of the shielding means 40 is dependent on head geometry and materials, the shielding means 40 is generally located approximately from one-fourth to one-fifth the length of the magnetic heads from the magnetic heads.

In further accordance with the present invention, eddy current means 50 and 52 are mounted within the recesses 13 of housing 12 and adjacent to the write magnetic head means 20 and the read magnetic heads 28, respectively. The eddy current means 50 and 52 are completely shielded from the housing 12 by shielding means 40. The eddy current means 50 and 52 provide a control path for eddy currents induced by the magnetic heads 20 and 28. The eddy current means 50 and 52 increase the resistance path of the eddy currents and also confine the eddy currents to a path remote from the housing 12. As shown in FIG. 1, small eddy currents 54 are confined to the eddy current means 50 and 52 and cannot expand to the edges of the metallic housing 12, as illustrated by dotted lines 56 representing large unwanted eddy currents in the housing 12. The combination of the eddy current means 50, 52, and the shield means 40 prevents the formation of eddy currents 56. In effect, the eddy currents are both reduced in intensity and are kept remote from the opposite magnetic heads by eddy current means 50 and 52.

Since the strongest eddy currents are induced in the housing 12 by the write magnetic head means 20, it is suitable to use only eddy current means 50 in conjunction with shielding means 40; however, better results have been obtained using eddy current means at both sides of the head. The eddy current means 52 and shielding means 40 at the read head further attenuate any stray eddy currents which appear in the housing adjacent the read magnetic head means 28 by keeping them remote from the read magnetic head means.

The shielding means 40 does not have to be a continuous one-piece shield since it is not intended to establish an electrically conductive path. The permeability of the shield means 40 preferably is high compared to the material of the housing 12 so that the greatest amount of leakage goes through the shield in preference to the housing. The shield means 40 can be of a high nickel alloy, that is, any material having a permeability above a thousand for significantly reduced flux. If a material is used having a permeability of less than a thousand, there will be some degradation in the effect of the shield. The eddy current means 50 and 52 preferably are conductive materials such as brass or aluminum.

Referring to FIG. 3, an alternate design for the eddy current means 52*l* is shown which directly abuts the read magnetic head means rather than extending over it as shown in FIG. 2. Mainly, the requirements are that the eddy current means be in close proximity to the high-intensity stray flux from the magnetic heads and provide a conductive path for a sufficient quantity of the stray flux.

Figure 4:
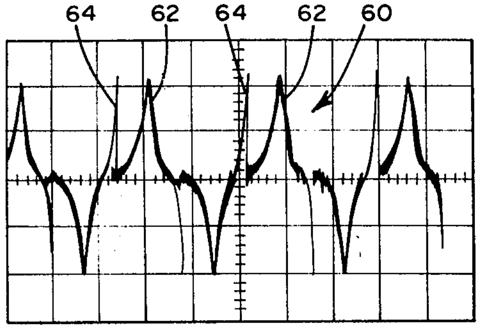
FIG. 4 is a graphic illustration of the feedthru flux in conjunction with a normal signal in the read head of a commercial redundant magnetic head without its normal front shield.
Figure 5:
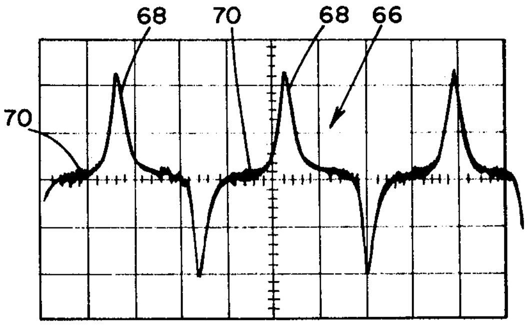
FIG. 5 is a graphic representation of the feedthru flux in conjunction with a normal signal in the read head of redundant magnetic head embodying shielding means and eddy current means of the present invention.

In order to further illustrate the effects of the present invention, reference is made to FIGS. 4 and 5 for comparison. This is to further clarify that the shielding means 40 and the eddy current means 50 and 52 attenuate the write signal in the read head. As shown in FIG. 4, a typical output curve 60 from a read head is shown wherein the peaks 62 of the curve 60 are the signals which it is desired to read as output on the read head. The portions 64 of the curve 60 are the feedthru signals from the write head which are undesirable. The magnetic head used for this typical curve is a conventional commercial magnetic redundant head without its normal front shield. As shown in FIG. 5, a similar signal was recorded as output curve 66 using a magnetic redundant head embodying the present invention. The desirable output portions 68 are shown in this graph (corresponding to portions 62 of curve 60); however, the use of the present invention shielding means and eddy current means attenuates the feedthru portions 70 to rather small distortions which are approximately reduced to one-fortieth of the value of the feedthru portions 64 on the curve 60 in FIG. 4.

Figure 6:
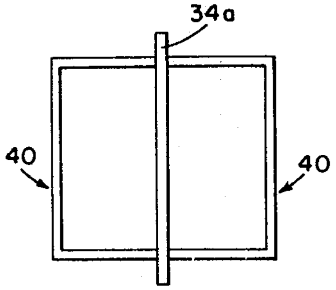
FIGS. 6–8 are schematic representations of alternate embodiments of the present invention.
Figure 7:
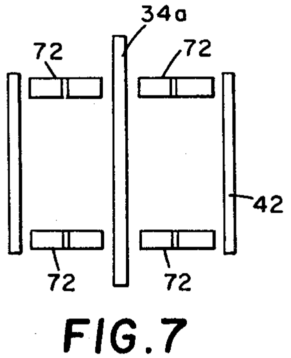
Figure 8:
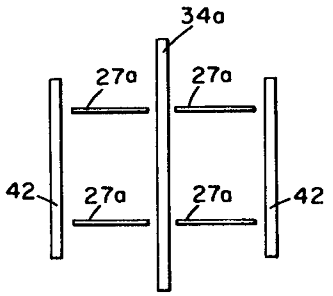

In further accordance with the present invention, the following embodiments are shown in schematic form in FIGS. 6 through 8, and are based on structural alignment with a magnetic redundant head similar to the one shown in FIG. 1.

In FIG. 6, the transverse shielding means 34*a* is a single piece of shielding material. The dividing portion 18 of housing 12 has been removed between the two layers 34 (see FIG. 1) which can be done to closer spacing between the write and read gaps 22, 30, respectively. The shielding means 40 is the same as shown in FIG. 1.

As shown in FIG. 7, the transverse portions 42 of shielding means 40 are the same as shown in FIG. 1, however, the longitudinal portions 44 of shielding means 40 have been replaced by dummy magnetic heads 72 which serve to shield in essentially the same manner as longitudinal portions 44 of shielding means 40 do in FIG. 1.

As shown in FIG. 8, the longitudinal portions 44 of shielding means 40 have been replaced by the internal shield means 27*a* which are interspaced between the magnetic transducer means. The transverse portions 42 of shielding means 40 is identical to that shown in FIG. 1.

The specific embodiments of the present invention which have been illustrated and described in detail are intended by way of example and the scope of the invention is to be determined by the appended claims.

What I claim as new and desire to secure by letters Patent of the United States is:

1. A redundant magnetic transducer head for use with magnetic tape comprising:

an electrically conductive housing;

write magnetic head means mounted within said housing;

read magnetic head means mounted within said housing spaced from and opposite from said write head to read from the same tape channel that said write head writes on;

first transverse magnetic shielding means extending across said housing between said read and write heads;

eddy current means mounted in said housing adjacent said write magnetic head means to provide a controlled path for eddy currents induced therein by said write head means;

and second magnetic shielding means mounted within said housing between said eddy current means and said housing to shield said housing from said eddy current means.

2. A redundant magnetic transducer head, as in claim 1, wherein said second magnetic shielding means is mounted transverse to the motion of the magnetic tape within said housing between said eddy current means and said housing.

3. A redundant magnetic transducer head, as in claim 1, wherein said second magnetic shielding means includes dummy write magnetic head means located between said write magnetic head means and said housing, and extending parallel to the direction of motion of said tape.

4. A redundant magnetic transducer head, as in claim 1, wherein second magnetic shielding means is located one-fourth to one-fifth the length of said write magnetic head means from said write magnetic head means.

5. A redundant magnetic transducer head, as in claim 1, wherein said second magnetic shielding means is a high-permeability material such as Mu metal.

6. A redundant magnetic transducer head, as in claim 1, wherein said eddy current means is an electrically conductive material such as aluminum or brass.

7. A redundant magnetic transducer head, as in claim 1, wherein the said eddy current means and the said second magnetic shielding means are located at two places, the first between the read head and the said electrically conductive housing and the second between the write head and said housing.